United States Patent [19]
Lutz

[11] 4,114,945
[45] Sep. 19, 1978

[54] GUIDE SHOES

[75] Inventor: Alfons Lutz, Emmering, Fed. Rep. of Germany

[73] Assignee: Webasto-Werk W. Baier GmbH & Co., Fed. Rep. of Germany

[21] Appl. No.: 745,977

[22] Filed: Nov. 29, 1976

[30] Foreign Application Priority Data

Nov. 28, 1975 [DE] Fed. Rep. of Germany ....... 2553549

[51] Int. Cl.² .................................................. B60j 7/10
[52] U.S. Cl. ................................ 296/137 E; 308/3 R
[58] Field of Search ................... 296/137 E; 308/3 R, 308/6 R

[56] References Cited

U.S. PATENT DOCUMENTS

| 3,066,976 | 12/1962 | Rehmann | 296/137 E |
| 3,558,183 | 1/1971 | Sigmund | 296/137 E |

FOREIGN PATENT DOCUMENTS 2,234,852  1/1974  Fed. Rep. of Germany ....... 296/137 E Primary Examiner—Robert R. Song
Attorney, Agent, or Firm—Craig & Antonelli

[57] ABSTRACT

An improved guide shoe is provided which is intended for sliding movement in a rail of U-shaped cross-section, and which supports a sliding roof part for a vehicle. The guide shoe is formed from an elastically deformable material, preferably rubber, and has a friction-reducing covering on each of its respective three surfaces slidably engaging the rail.

8 Claims, 3 Drawing Figures

GUIDE SHOES

BACKGROUND AND SUMMARY OF THE INVENTION

The present invention relates to a guide shoe for sliding within a rail of U-shaped cross-section. It has particular application to a guide shoe for a sliding roof of a vehicle, which shoe is connected with a slidable part of the vehicle roof and is guided within a rail having a U-shaped cross-section.

Said guide shoes must be constructed in such a way that over a long period of time they are guided in their rails with as little lateral movement as possible in order to avoid rattling of the said slidable part. In addition, there must be minimum friction of the guide shoes in their rails. Various guide shoe constructions are known for the fulfillment of these requirements, but each of these has certain disadvantages. The guide shoe described in German Pat. No. 1,111,962 is made from plastics material and is constructed in such a way that its ends engage resiliently in the guide rails. The plastics material used must be relatively hard in order to ensure engagement of the guide shoe with the rail surfaces with a force which is such that even in the case of the powerful impacts which the vehicle occasionally suffers, rattling of the sliding roof is prevented. As a result of the material hardness, relatively narrow tolerances must be provided both for the guide shoe and for the guide rail. There is also the danger that after a not particularly long period, the material will be subject to fatigue and lose the necessary tension. To avoid this, a guide shoe according to German Auslegeschrift No. 1,630,330 (U.S. Pat. No. 3,558,183) uses a plastics body in which is embedded a metallic spring. Due to the metallic spring, this guide shoe maintains its elasticity over a longer period and, due to the plastics body, has good sliding characteristics. However, as a result of pressure on the springs, this guide shoe may rise from a sliding surface, resulting in the loss of the precise guidance in the vertical direction and the occurrence of rattling. In addition, this guide shoe has the disadvantage of relatively high manufacturing costs.

The present invention contemplates providing a guide shoe, which is characterized by simple construction and ease of manufacture and which permits larger tolerances of the guide rail in both vertical and horizontal directions.

According to the invention, the guide shoe is made from an elastically deformable material, e.g. a rubber, and a friction reducing support on its sliding surfaces is provided.

The use of an elastically deformable material permits the guide shoe to be constructed in such a way that it can always be inserted into the guide rail with an initial stress, i.e. accompanied by compression. This compensates for relatively large tolerance fluctuations in the spacings of the legs of the guide rail. Moreover, the guide shoe according to the invention also compensates for the tolerances in the horizontal direction, i.e. differences in the spacing between the crosspieces of two guide rails fitted to the opposed lateral edges of the roof opening, because said crosspieces serve to guide the slidable roof part in the horizontal direction, i.e. for centering relative to the roof opening. This problem has not hitherto been tackled. Thus, the term "sliding surfaces" is understood to mean not only the peripheral surfaces of the guide shoe sliding on the inner surfaces of the legs of the U-shaped rail, but also the rear surfaces of the guide shoe which cooperate with the inner surface of the crosspiece of the U-section.

In preferred embodiments, the support is made from a backed foil, e.g. of polytetrafluoroethylene or a similar material with good sliding characteristics.

However, the support can also comprise a coating of a slidable material, e.g. polyamide, in accordance with other preferred embodiments of the invention.

The present invention also contemplates embodiments with the sliding surfaces covered with fibers of a slidable material; for example polyamide fibers.

In order to reduce the contact surface of the guide shoe on the rail, the sliding surfaces are preferably formed by projections from the main body of the shoe.

These and further objects, features and advantages of the present invention will become more obvious from the following description when taken in conjunction with the accompanying drawings which show, for purposes of illustration only, a single embodiment in accordance with the present invention.

DETAILED DESCRIPTION OF THE DRAWINGS

Figure 1:
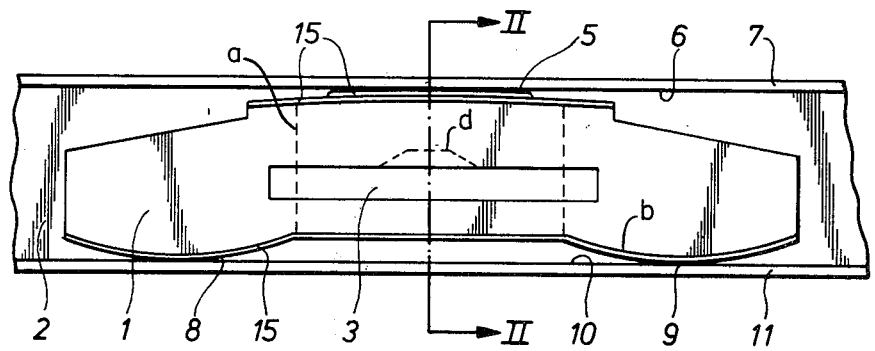
FIG. 1 is a side view of a guide shoe, arranged in a U-shaped rail and constructed in accordance with a preferred embodiment of the invention.
Figure 2:
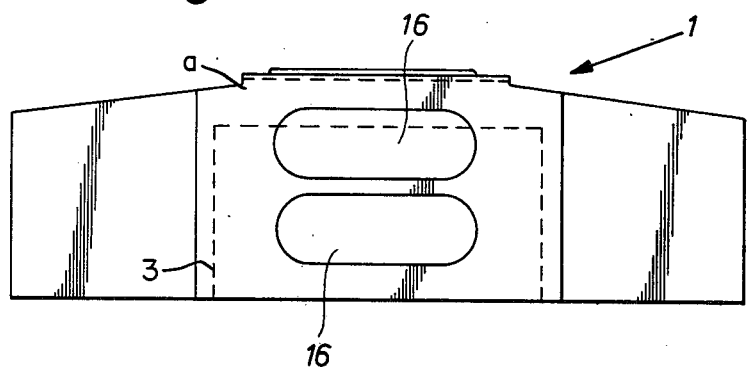
FIG. 2 is a sectional view along the line II—II of FIG. 1.

Referring to the drawings, a guide shoe 1 is guided in a rail 2 having a U-shaped cross-section and has a central opening 3 into which can be inserted a beam 4 connected with a slidable part of a vehicle roof. The guide shoe 1 is made from a rubber with a Shore hardness of approximately 50°. As can be seen in FIGS. 1 and 2, the top 5 of guide shoe 1 rests on the inner surface 6 of the upper leg 7, whilst the bottom of said shoe rests at points 8 and 9 on the inner surface 10 of the lower leg 11 of rail 2. The rear 12 of shoe 1 contacts the inner surface 13 of crosspiece 14 of rail 2. As the coefficient of friction of a rubber-elastic material is relatively high compared with virtually any other material, guide shoe 1 is provided with a friction-reducing support 15 at least at those points where it comes into contact with rail 2. This support can be in the form of a thin backed polytetrafluoroethylene foil or some other material with good sliding characteristics. The foil thickness can be, for example, 0.25 mm. Instead of using the foil, it is contemplated to coat at least points 5, 8, 9 and 12 of the guide shoe with a slidable material, for example polyamide. It has proved particularly advantageous to cover these surfaces with fibers, for example of polyamide.

Figure 3:
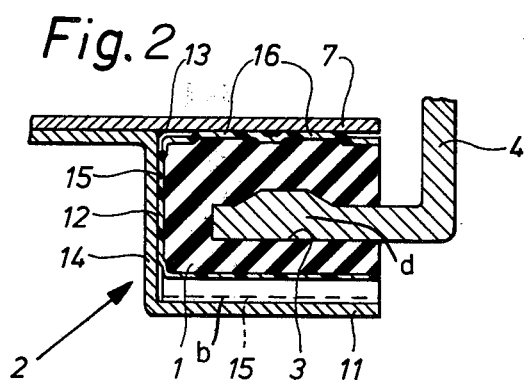
FIG. 3 is a plan view of the guide shoe of FIGS. 1 and 2.

To reduce the contact surface between the guide shoe and the guide rail 2, the surfaces 5, 8 and 9 are cambered. In addition, the sliding surfaces can be formed from individual projections, designated by the reference numeral 16 for surface 5 in FIGS. 2 and 3.

While I have shown and described several embodiments in accordance with the present invention, it is understood that the same are not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A sliding roof assembly of a vehicle comprising a rail having three surfaces defining a U-shaped cross-section within which is guided a guide shoe, said guide shoe being connected with a slidable part of the vehicle roof, and wherein the guide shoe is formed by an elastically deformable body for resiliently engaging the three surfaces and has a friction-reducing covering on its surfaces for sliding contact with the rail, whereby tolerances in the horizontal as well as vertical directions may be compensated for.

2. An assembly according to claim 1, wherein said elastically deformable material is a rubber.

3. An assembly according to claim 1, wherein said covering is formed of fibers of a low-friction material.

4. An assembly according to claim 3, wherein the said surfaces are formed by projections from the main body of the guide shoe.

5. An assembly according to claim 1, wherein said covering is formed from a foil of slidable material.

6. An assembly according to claim 5, wherein said slidable material is polytetrafluoroethylene.

7. An assembly according to claim 1, wherein said covering is formed from a coating of a low-friction material.

8. An assembly according to claim 7, wherein said low friction material is a polyamide.

* * * * *